(12) United States Patent
Kiyomura

(10) Patent No.: US 9,816,452 B2
(45) Date of Patent: Nov. 14, 2017

(54) CONTROL DEVICE AND CONTROL METHOD FOR INTERNAL COMBUSTION ENGINE

(71) Applicant: Hitachi Automotive Systems, Ltd., Hitachinaka-shi, Ibaraki (JP)

(72) Inventor: Akira Kiyomura, Isesaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 15/513,453

(22) PCT Filed: Nov. 5, 2015

(86) PCT No.: PCT/JP2015/081175
§ 371 (c)(1),
(2) Date: Mar. 22, 2017

(87) PCT Pub. No.: WO2016/072454
PCT Pub. Date: May 12, 2016

(65) Prior Publication Data
US 2017/0298845 A1 Oct. 19, 2017

(30) Foreign Application Priority Data
Nov. 5, 2014 (JP) .................................. 2014-225192

(51) Int. Cl.
*F02D 41/00* (2006.01)
*F02D 15/04* (2006.01)
(Continued)

(52) U.S. Cl.
CPC ............ *F02D 41/009* (2013.01); *F02B 75/04* (2013.01); *F02D 15/04* (2013.01); *F02D 41/22* (2013.01); *F02D 41/26* (2013.01)

(58) Field of Classification Search
CPC ........ F02D 41/00; F02D 41/009; F02D 15/04; F02D 41/22; F02D 41/26; F02B 75/04
See application file for complete search history.

(56) References Cited

U.S. PATENT DOCUMENTS

| | | | |
|---|---|---|---|
| 8,606,490 B2* | 12/2013 | Ando ..................... | B60K 6/445 123/347 |
| 9,550,491 B2* | 1/2017 | Kamatani ............... | B60K 6/445 |
| 2006/0180118 A1 | 8/2006 | Takemura et al. | |

FOREIGN PATENT DOCUMENTS

| | | | | |
|---|---|---|---|---|
| JP | 09217614 A | * | 8/1997 | ................ F01L 1/04 |
| JP | 2006-226133 A | | 8/2006 | |

(Continued)

OTHER PUBLICATIONS

International Search Report (PCT/ISA/210) issued in PCT Application No. PCT/JP2015/081175 dated Jan. 19, 2016 with English translation (3 pages).

(Continued)

Primary Examiner — Hieu T Vo
(74) Attorney, Agent, or Firm — Crowell & Moring LLP

(57) ABSTRACT

A control device for an internal combustion engine controls a control object device based on an output value of a relative angle sensor that detects a relative angle of an output shaft of an actuator, and an output value of an absolute angle sensor that detects an absolute angle of a drive shaft coupled to the output shaft of the actuator via a speed reducer. In this event, the control device for the internal combustion engine corrects an output value of the absolute angle sensor based on an absolute angle of the drive shaft that is obtained from an output value of the relative angle sensor using, as a reference point, an output value of the absolute angle sensor at the start-up of the internal combustion engine, and an output value of the absolute angle sensor.

10 Claims, 9 Drawing Sheets

(51) Int. Cl.
*F02D 41/26* (2006.01)
*F02D 41/22* (2006.01)
*F02B 75/04* (2006.01)

(56) References Cited

FOREIGN PATENT DOCUMENTS

| | | |
|---|---|---|
| JP | 2009-144560 A | 7/2009 |
| JP | 2012-132345 A | 7/2012 |

OTHER PUBLICATIONS

Japanese-language Written Opinion (PCT/ISA/237) issued in PCT Application No. PCT/JP2015/081175 dated Jan. 19, 2016 with English translation (6 pages).
International Preliminary Report on Patentability (PCT/IB/326, PCT/IB/338, & PCT/IB/373) issued in PCT Application No. PCT/JP2015/081175 dated May 18, 2017 (7 pages).

* cited by examiner

CONTROL DEVICE AND CONTROL METHOD FOR INTERNAL COMBUSTION ENGINE

TECHNICAL FIELD

The present invention relates to a control device and a control method for an internal combustion engine.

BACKGROUND ART

In the control of a variable compression ratio mechanism, a compression ratio sensor that detects a compression ratio from a rotation angle of a control shaft of a multi-link mechanism is used as described in Japanese Patent Application Laid-open Publication No. 2006-226133 (Patent Document 1). The compression ratio sensor includes a relative angle sensor that detects a relative angle of an actuator, and an absolute angle sensor that detects an absolute angle of the control shaft coupled to an output shaft of the actuator via a speed reducer. An output value of the absolute angle sensor is obtained as a reference point at the start-up of an internal combustion engine, and thereafter, a rotation angle of the control shaft is calculated from an output value of the relative angle sensor.

REFERENCE DOCUMENT LIST

Patent Document

Patent Document 1: Japanese Patent Application Laid-open Publication No. 2006-226133

SUMMARY OF THE INVENTION

Problems to be Solved by the Invention

In the meantime, absolute angle sensors are subjected to dispersion due to tolerance, thermal expansion, and so on, dispersion due to accuracy of the sensors themselves, dispersion due to input circuits of controllers, and so on. Therefore, in the absolute angle sensor, there is a possibility that a plurality of dispersions are accumulated to decrease the absolute angle detection accuracy. If the absolute angle detection accuracy is decreased, for example, it becomes difficult to control the compression ratio to a target compression ratio that corresponds to an engine operating state.

Therefore, it is an object of the present invention to provide a control device and a control method for an internal combustion engine, that are improved in absolute angle detection accuracy.

Means for Solving the Problems

Accordingly, a control device for an internal combustion engine controls a control object device based on an output value of a relative angle sensor that detects a relative angle of an output shaft of an actuator, and an output value of an absolute angle sensor that detects an absolute angle of a drive shaft coupled to the output shaft of the actuator via a speed reducer. In this event, the control device corrects an output value of the absolute angle sensor based on an absolute angle of the drive shaft that is obtained from an output value of the relative angle sensor using, as a reference point, an output value of the absolute angle sensor at the start-up of the internal combustion engine, and an output value of the absolute angle sensor.

Effects of the Invention

According to the present invention, it is possible to improve the absolute angle detection accuracy.

MODE FOR CARRYING OUT THE INVENTION

Hereinbelow, an embodiment for carrying out the present invention will be described in detail with reference to the accompanying drawings.

Figure 1:
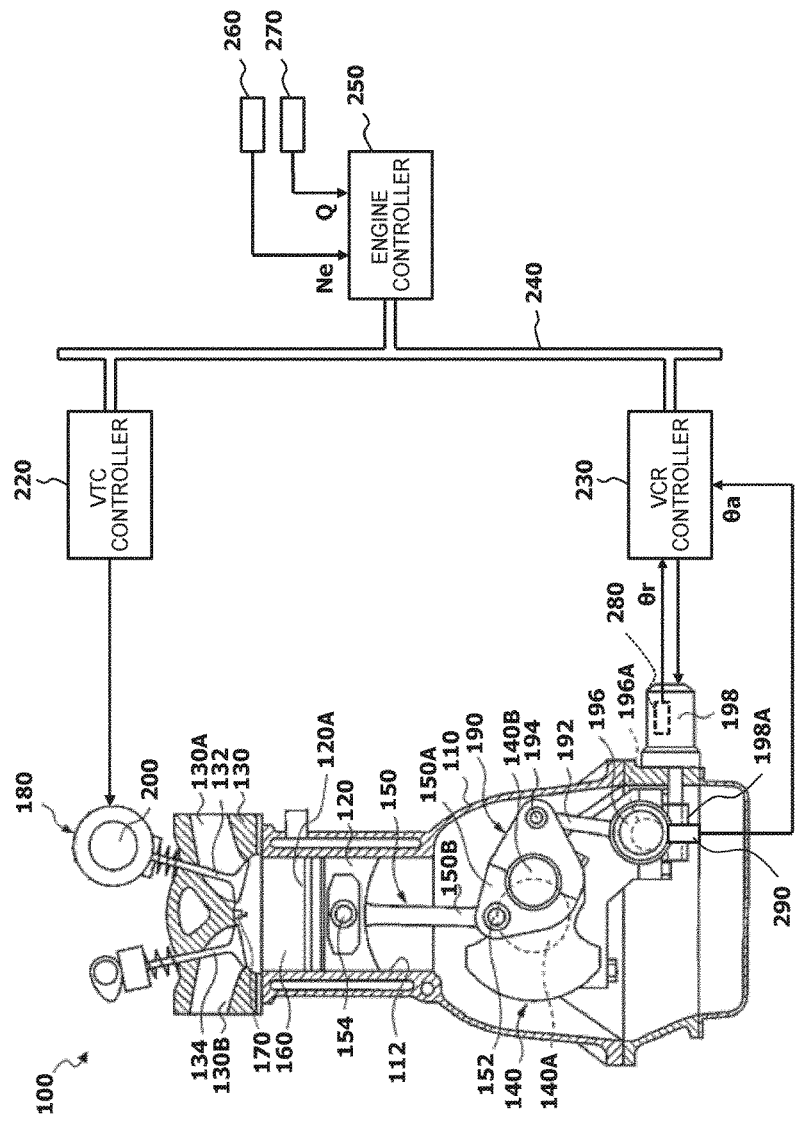
FIG. 1 is a system diagram illustrating one example of an internal combustion engine for a vehicle.

FIG. 1 illustrates one example of an internal combustion engine for a vehicle.

An internal combustion engine 100 includes a cylinder block 110, a piston 120 reciprocatingly disposed in a cylinder bore 112 of cylinder block 110, a cylinder head 130 formed with an intake port 130A and an exhaust port 130B, and an intake valve 132 and an exhaust valve 134 that open or close open ends of intake port 130A and exhaust port 130B.

Piston 120 is coupled to a crankshaft 140 via a con'rod (connecting rod) 150 including a lower link 150A and an upper link 150B. A combustion chamber 160 is formed between a top surface 120A of piston 120 and a lower surface of cylinder head 130. A spark plug 170 that ignites a mixture of fuel and air is attached to the approximate center of cylinder head 130 forming combustion chamber 160.

Internal combustion engine 100 includes a variable valve timing (VTC) mechanism 180 that makes variable the phase of the open period of intake valve 132 relative to crankshaft 140, and a variable compression ratio (VCR) mechanism 190 that makes the compression ratio variable by changing the volume of combustion chamber 160. Herein, VCR mechanism 190 is given as one example of a control object device.

For example, by changing the phase of an intake camshaft 200 relative to crankshaft 140 using an actuator such as an electric motor, VTC mechanism 180 advances or retards the center phase of the operating angle of intake valve 132 while keeping the operating angle constant.

By changing the volume of combustion chamber 160 using a multi-link mechanism, for example, like one disclosed in Japanese Patent Application Laid-open Publication No. 2002-276446, VCR mechanism 190 makes the compression ratio of internal combustion engine 100 variable. Hereinbelow, one example of VCR mechanism 190 will be described.

Crankshaft 140 includes a plurality of journal portions 140A and a plurality of crank pin portions 140B, and journal portions 140A are rotatably supported by main bearings (not illustrated) of cylinder block 110. Crank pin portions 140B are eccentric to journal portions 140A, and lower link 150A is rotatably coupled to each of crank pin portions 140B. Upper link 150B has a lower end side pivotally coupled to one end of lower link 150A by a coupling pin 152 and has an upper end side pivotally coupled to piston 120 by a piston pin 154. A control link 192 has an upper end side pivotally coupled to the other end of lower link 150A by a coupling pin 194 and has a lower end side pivotally coupled to a lower portion of cylinder block 110 via a control shaft 196. Specifically, control shaft 196 is rotatably supported by the engine body (cylinder block 110) and has an eccentric cam portion 196A that is eccentric to the rotation center of control shaft 196, while a lower end portion of control link 192 is rotatably fitted to eccentric cam portion 196A. The rotational position of control shaft 196 is controlled by a compression ratio control actuator 198 that uses an electric motor. Herein, control shaft 196 is given as one example of a drive shaft, while compression ratio control actuator 198 is given as one example of an actuator.

In VCR mechanism 190 using such a multi-link mechanism, when control shaft 196 is rotated by compression ratio control actuator 198, the center position of eccentric cam portion 196A, i.e. the relative position of eccentric cam portion 196A to the engine body (cylinder block 110), changes. When the pivotal support position of the lower end of control link 192 is changed by this, the position of piston 120 at the piston top dead center (TDC) becomes higher or lower, so that the volume of combustion chamber 160 increases or decreases to change the compression ratio of internal combustion engine 100. In this event, when the operation of compression ratio control actuator 198 is stopped, control link 192 is rotated relative to eccentric cam portion 196A of control shaft 196 by the reciprocating motion of piston 120, so that the compression ratio shifts to the low compression side.

Figure 2:
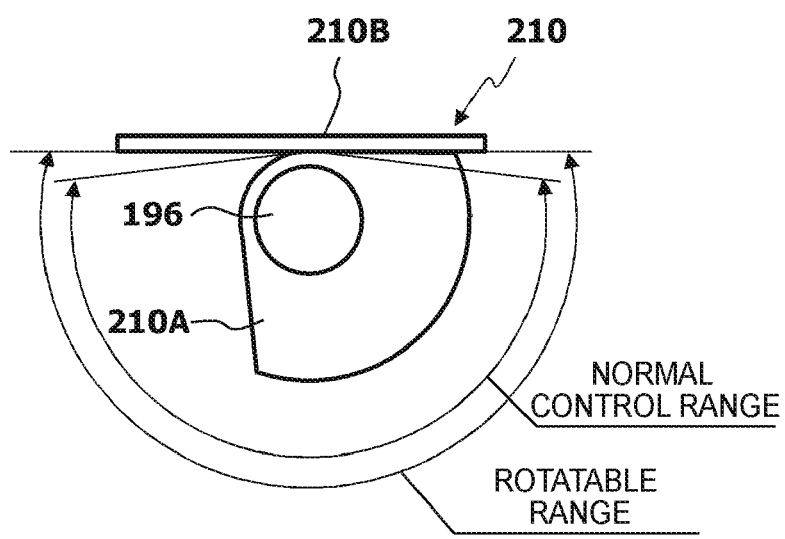
FIG. 2 is a partial enlarged view illustrating one example of a stopper mechanism.

As illustrated in FIG. 2, a stopper mechanism 210 that restricts the displacement (rotation) of control shaft 196 when control shaft 196 is rotated beyond a normal control range is attached to VCR mechanism 190. Stopper mechanism 210 includes a generally fan-shaped first member 210A whose pivot portion is fixed to control shaft 196, and a plate-shaped second member 210B fixed to cylinder block 110. First member 210A rotates integrally with control shaft 196. When control shaft 196 is rotated beyond a maximum compression ratio (upper limit) or a minimum compression ratio (lower limit) in the normal control range, second member 210B comes in contact with one of two sides defining a central angle of first member 210A, thereby restricting the displacement of control shaft 196 being one example of a mechanism member. Herein, since stopper mechanism 210 functions when control shaft 196 has exceeded the normal control range, first member 210A and second member 210B do not come in contact with each other in normal control, so that, for example, it is possible to suppress the occurrence of abnormal noise or the like. Stopper mechanism 210 is used for learning a reference position of control shaft 196.

Stopper mechanism 210 is sufficient if it can restrict the displacement on at least one of the maximum compression ratio side and the minimum compression ratio side with respect to the rotation of control shaft 196. Further, stopper mechanism 210 is sufficient if it can restrict the displacement of control shaft 196 by two members that are not limited to generally fan-shaped first member 210A and plate-shaped second member 210B, but have other shapes.

VTC mechanism 180 and VCR mechanism 190 are electronically controlled by a VTC controller 220 and a VCR controller 230, respectively, each incorporating a processor such as a microcomputer. VTC controller 220 and VCR controller 230 are connected to an engine controller 250, incorporating a processor such as a microcomputer and configured to electronically control internal combustion engine 100, via, for example, a CAN (Controller Area Network) 240 being one example of an in-vehicle network. Therefore, arbitrary data can be sent and received via CAN 240 between VTC controller 220, VCR controller 230, and engine controller 250. A known network such as FlexRay (registered trademark), not limited to CAN 240, can be used as an in-vehicle network. Herein, VCR controller 230 is given as one example of a control device.

As one example of an operating state of internal combustion engine 100, output signals of a rotational speed sensor 260 that detects a rotational speed Ne of internal combustion engine 100, and a load sensor 270 that detects a load Q of internal combustion engine 100 are input to engine controller 250. Herein, as the load Q of internal combustion engine 100, it is possible to use, for example, a state quantity closely related to torque, such as intake negative pressure, intake flow rate, supercharging pressure, accelerator opening degree, or throttle opening degree. For example, by referring to maps in which target values matching rotational speeds and loads are set, engine controller 250 calculates a target angle of VTC mechanism 180 and a target compression ratio of VCR mechanism 190 corresponding to the rotational speed Ne and the load Q of internal combustion engine 100, respectively. Then, engine controller 250 sends the target angle and the target compression ratio to VTC controller 220 and VCR controller 230 via CAN 240, respectively.

VTC controller 220 having received the target angle controls a drive current to be output to the actuator of VTC mechanism 180 such that a real angle (actual angle) that is detected by a non-illustrated sensor converges to the target angle. VCR controller 230 having received the target compression ratio controls a drive current to be output to compression ratio control actuator 198 of VCR mechanism 190 such that a real compression ratio (actual compression ratio) that is detected by a later-described sensor converges to the target compression ratio. By doing this, VTC mechanism 180 and VCR mechanism 190 are controlled to the target values corresponding to the operating state of internal combustion engine 100.

A compression ratio sensor that detects an actual compression ratio of internal combustion engine 100 includes a relative angle sensor 280 that detects a relative angle $\theta r$ of an output shaft of compression ratio control actuator 198, and an absolute angle sensor 290 that detects an absolute angle $\theta a$ of control shaft 196 coupled to the output shaft of compression ratio control actuator 198 via a speed reducer 198A. Herein, relative angle sensor 280 is composed of a resolver sensor and so on incorporated in compression ratio control actuator 198 and detects a rotation angle of the output shaft of compression ratio control actuator 198 in a range of 0 to 360°. Using an output value of absolute angle sensor 290 at the engine start-up as a reference point, VCR controller 230 detects an absolute angle of control shaft 196, i.e. a compression ratio of internal combustion engine 100, from an output value of relative angle sensor 280 in consideration of a reference position and a correction value which will be described later. This is because relative angle sensor 280 has high resolution while, for example, it cannot distinguish between 0° and 360° of the same phase, and absolute angle sensor 290 can detect an absolute angle of control shaft 196 while it has low resolution.

For example, in a vehicle assembly plant, VCR controller 230 learns a reference position and correction values starting from when an initialization request flag that is output from a diagnostic tool connected to CAN 240 is turned from LOW to HI. That is, VCR controller 230 shifts the compression ratio of internal combustion engine 100 to the high compression ratio side and stores, for example, in a RAM (Random Access Memory) a difference 1 that is obtained by subtracting per predetermined reference angle an output value of absolute angle sensor 290 from an absolute angle of control shaft 196 obtained from an output value of relative angle sensor 280. Herein, it is assumed that when learning the reference position and the correction values, control shaft 196 of VCR mechanism 190 is in an initial state where the displacement of control shaft 196 to the low compression ratio side is restricted by stopper mechanism 210.

Then, when control shaft 196 has reached a state where the displacement of control shaft 196 to the high compression ratio side is restricted by stopper mechanism 210 as a result of shifting the compression ratio of internal combustion engine 100 to the high compression ratio side, VCR controller 230 sets an output value of absolute angle sensor 290 as a reference position. This reference position can be referred to in subsequent control and thus is written into a non-volatile memory such as, for example, a flash ROM (Read Only Memory).

Then, VCR controller 230 shifts the compression ratio of internal combustion engine 100 to the low compression ratio side and stores, for example, in the RAM a difference 2 that is obtained by subtracting per predetermined reference angle an output value of absolute angle sensor 290 from an absolute angle of control shaft 196 obtained from an output value of relative angle sensor 280. Then, VCR controller 230 calculates a mean value of the difference 1 and the difference 2 per reference angle and writes it into the non-volatile memory as a correction value.

Figure 3:
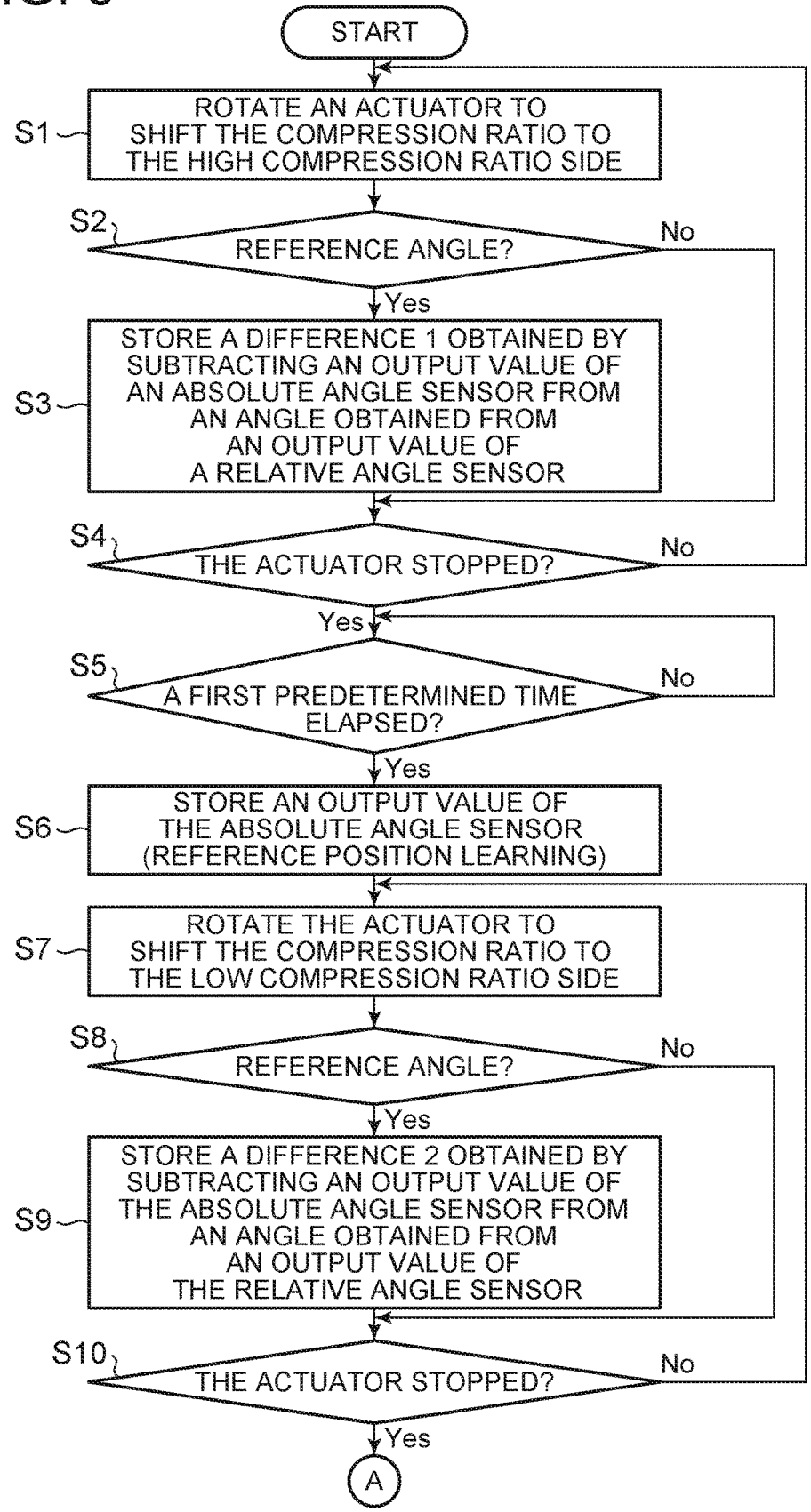
FIG. 3 is a flowchart illustrating one example of a reference position and correction value learning process.
Figure 4:
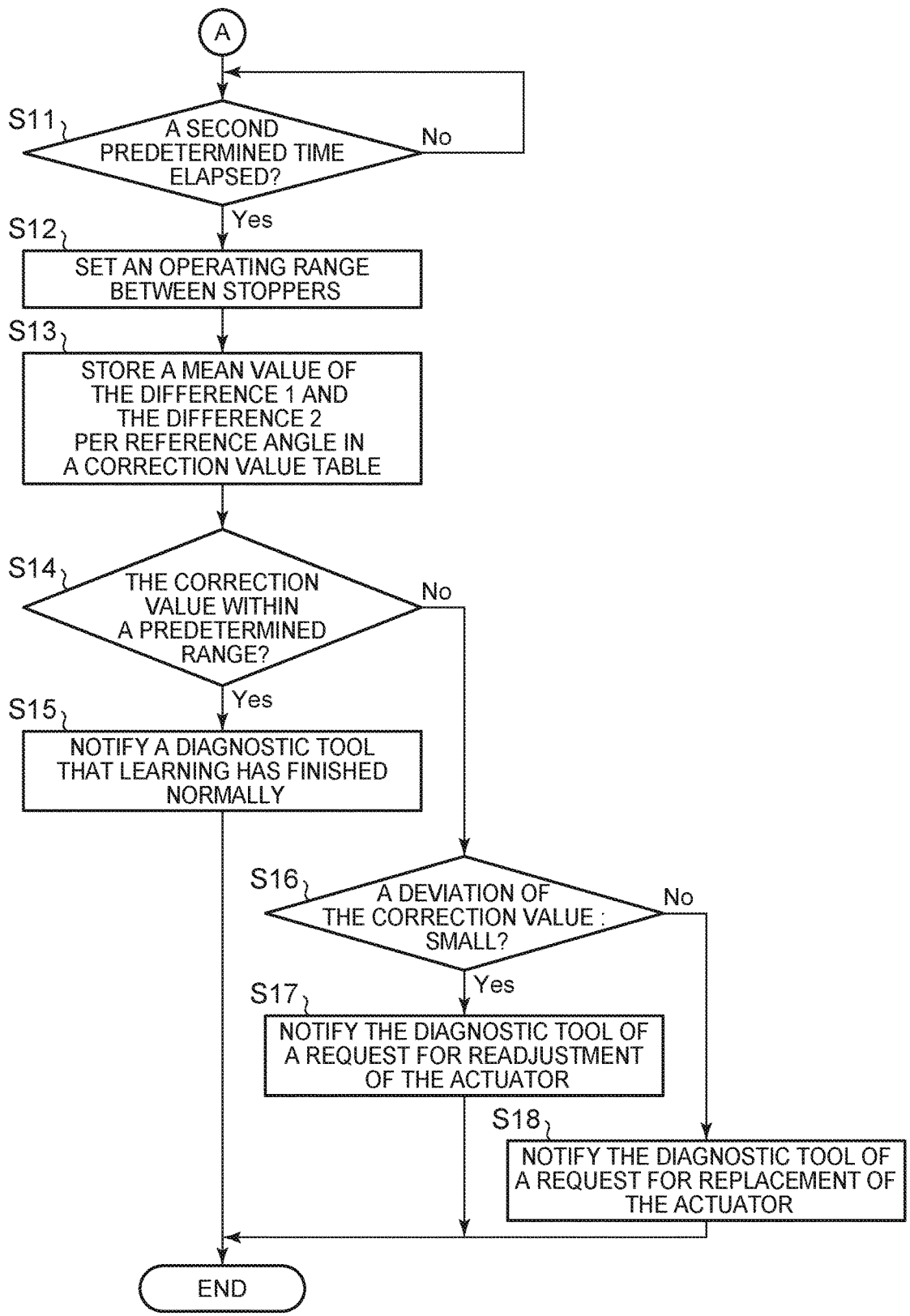
FIG. 4 is a flowchart illustrating one example of the reference position and correction value learning process.

FIGS. 3 and 4 illustrate one example of a reference position and correction value learning process that is performed by the processor of VCR controller 230 according to a control program stored in the non-volatile memory. This learning process can be performed starting from when the initialization request flag of the diagnostic tool is turned from LOW to HI, or alternatively, can be performed, for example, during self-shutdown starting from when the vehicle has traveled a predetermined time or a predetermined distance.

At step 1 (abbreviated as "S1" in the figure; the same shall apply hereinafter), the processor of VCR controller 230, for example, outputs a drive signal to compression ratio control actuator 198 of VCR mechanism 190, thereby rotating compression ratio control actuator 198 to shift the compression ratio of internal combustion engine 100 to the high compression ratio side. In this event, the processor of VCR controller 230 controls the rotation of compression ratio control actuator 198 by speed feedback control (the same shall apply hereinafter).

At step 2, the processor of VCR controller 230 determines whether or not an absolute angle of control shaft 196 that is obtained from an output value of relative angle sensor 280 using, as a reference point, an absolute angle of control shaft 196 in its initial state has reached a reference angle. Herein, the reference angle can be set per 10°, such as, for example, 10°, 20°, 30° . . . . Then, the processor of VCR controller 230 causes the process to proceed to step 3 when it has determined that the absolute angle of control shaft 196 has reached the reference angle (Yes), and causes the process to proceed to step 4 when it has determined that the absolute angle of control shaft 196 has not reached the reference angle (No).

At step 3, the processor of VCR controller 230 stores, in the RAM in a state associated with the reference angle, a difference 1 that is obtained by subtracting an output value of absolute angle sensor 290 from an absolute angle of control shaft 196 obtained from an output value of relative angle sensor 280 in consideration of the reference point. Herein, the difference 1 includes backlash and deflection of speed reducer 198A and so on with respect to the direction in which the absolute angle of control shaft 196 decreases.

At step 4, the processor of VCR controller 230 determines whether or not compression ratio control actuator 198 has stopped, for example, by determining whether or not an output value of relative angle sensor 280 has changed. When compression ratio control actuator 198 has stopped, first member 210A of stopper mechanism 210 is in contact with second member 210B such that the displacement of control shaft 196 to the high compression ratio side is in a state of being restricted. Then, the processor of VCR controller 230 causes the process to proceed to step 5 when it has determined that compression ratio control actuator 198 has stopped (Yes), and causes the process to return to step 1 when it has determined that compression ratio control actuator 198 has not stopped (No).

At step 5, the processor of VCR controller 230 determines whether or not a first predetermined time has elapsed from the stop of compression ratio control actuator 198, for example, by using a built-in timing function. Herein, the first predetermined time is for ensuring a time until which the displacement of control shaft 196 to the high compression ratio side reaches a state of being securely restricted, and can be set as appropriate, for example, according to output characteristics of compression ratio control actuator 198 and a speed reduction ratio, and so on. Then, the processor of VCR controller 230 causes the process to proceed to step 6 when it has determined that the first predetermined time has elapsed (Yes), and waits when it has determined that the first predetermined time has not elapsed (No).

At step 6, the processor of VCR controller 230 writes an output value of absolute angle sensor 290 into the non-volatile memory. That is, since the absolute angle of control shaft 196 can be uniquely specified in the state where first member 210A of stopper mechanism 210 is pressed against second member 210B, the output value of absolute angle sensor 290 in that state is learned as a reference position.

At step 7, the processor of VCR controller 230, for example, outputs a drive signal to compression ratio control actuator 198 of VCR mechanism 190, thereby rotating compression ratio control actuator 198 to shift the compression ratio of internal combustion engine 100 to the low compression ratio side.

At step 8, the processor of VCR controller 230 determines whether or not an absolute angle of control shaft 196 that is obtained from an output value of relative angle sensor 280 using, as the reference point, the absolute angle of control shaft 196 in its initial state has reached the reference angle. Then, the processor of VCR controller 230 causes the process to proceed to step 9 when it has determined that the absolute angle of control shaft 196 has reached the reference angle (Yes), and causes the process to proceed to step 10 when it has determined that the absolute angle of control shaft 196 has not reached the reference angle (No).

At step 9, the processor of VCR controller 230 stores, in the RAM in a state associated with the reference angle, a difference 2 that is obtained by subtracting an output value of absolute angle sensor 290 from an absolute angle of control shaft 196 obtained from an output value of relative angle sensor 280 in consideration of the reference point. Herein, the difference 2 includes backlash and deflection of speed reducer 198A and so on with respect to the direction in which the absolute angle of control shaft 196 increases.

At step 10, the processor of VCR controller 230 determines whether or not compression ratio control actuator 198 has stopped, for example, by determining whether or not an output value of relative angle sensor 280 has changed. When compression ratio control actuator 198 has stopped, first member 210A of stopper mechanism 210 is in contact with second member 210B such that the displacement of control shaft 196 to the low compression ratio side is in a state of being restricted. Then, the processor of VCR controller 230 causes the process to proceed to step 11 when it has determined that compression ratio control actuator 198 has stopped (Yes), and causes the process to return to step 7 when it has determined that compression ratio control actuator 198 has not stopped (No).

At step 11, the processor of VCR controller 230 determines whether or not a second predetermined time has elapsed from the stop of compression ratio control actuator 198, for example, by using the built-in timing function. Herein, the second predetermined time is for ensuring a time until which the displacement of control shaft 196 to the low compression ratio side reaches a state of being securely restricted, and can be set as appropriate, for example, according to the output characteristics of compression ratio control actuator 198 and the speed reduction ratio, and so on. The second predetermined time may be equal to or different from the first predetermined time. Then, the processor of VCR controller 230 causes the process to proceed to step 12 when it has determined that the second predetermined time has elapsed (Yes), and waits when it has determined that the second predetermined time has not elapsed (No).

At step 12, the processor of VCR controller 230 sets, as an operating range of control shaft 196, a range that is defined by the state where the shift of the compression ratio to the high compression ratio side is restricted and the state where the shift of the compression ratio to the low compression ratio side is restricted, and writes it into the non-volatile memory. This operating range, for example, suppresses the rotation of control shaft 196 beyond the operating range and thus contributes to reducing the calorific value, the power consumption, and so on of compression ratio control actuator 198.

At step 13, the processor of VCR controller 230 refers to the differences 1 and the differences 2 stored in the RAM, obtains a mean value (correction value) of the difference 1 and the difference 2 per reference angle, and writes them as a correction value table into the non-volatile memory. Herein, the reason for obtaining the mean value of the difference 1 and the difference 2 is that since there are backlash and deflection of the transmission and so on that depend on the rotation direction of control shaft 196, it is intended to cancel them by averaging the differences 1 and 2.

At step 14, the processor of VCR controller 230 determines whether or not the correction value is within a predetermined range, per reference angle. Herein, the predetermined range is a threshold value for determining whether or not the correction value learning has finished normally, and, for example, can be set to a range that can ensure a desired control accuracy. Then, the processor of VCR controller 230 causes the process to proceed to step 15 when it has determined that the correction value is within the predetermined range (Yes), and causes the process to proceed to step 16 when it has determined that the correction value is deviated from the predetermined range (No).

At step 15, the processor of VCR controller 230 notifies the diagnostic tool that the reference position and correction value learning has finished normally. Therefore, by referring to the information sent from VCR controller 230, an operator operating the diagnostic tool can recognize that the learning has finished normally. In addition to notifying the diagnostic tool that the learning has finished normally, the processor of VCR controller 230 can change an initialization completion flag, indicating that the learning has finished normally, from LOW to HI.

At step 16, the processor of VCR controller 230 determines whether or not a deviation of the correction value is small, per reference angle, for example, by determining whether or not a deviation of the correction value from the predetermined range is less than or equal to a predetermined value. Herein, the predetermined value is a threshold value for determining whether or not the deviation of the correction value is caused by the mounting accuracy or the like of compression ratio control actuator 198, and, for example, can be set to a value that corresponds to a tolerance or the like of compression ratio control actuator 198. Then, the processor of VCR controller 230 causes the process to proceed to step 17 when it has determined that the deviation of the correction value is small (Yes), and causes the process to proceed to step 18 when it has determined that the deviation of the correction value is not small, i.e. the deviation of the correction value is large (No).

At step 17, the processor of VCR controller 230 notifies the diagnostic tool of a request for readjustment of compression ratio control actuator 198. Therefore, by referring to the information sent from VCR controller 230, the operator operating the diagnostic tool can recognize, for example, the need for readjusting the mounting or the like of compression ratio control actuator 198. In this case, after readjusting the mounting or the like of compression ratio control actuator 198, the operator may operate the diagnostic tool to send again an initialization request to VCR controller 230.

At step 18, the processor of VCR controller 230 notifies the diagnostic tool of a request for replacement of compression ratio control actuator 198. Therefore, by referring to the information sent from VCR controller 230, the operator operating the diagnostic tool can recognize the need for replacing compression ratio control actuator 198. In this case, after replacing compression ratio control actuator 198, the operator may operate the diagnostic tool to send again an initialization request to VCR controller 230.

Figure 5:
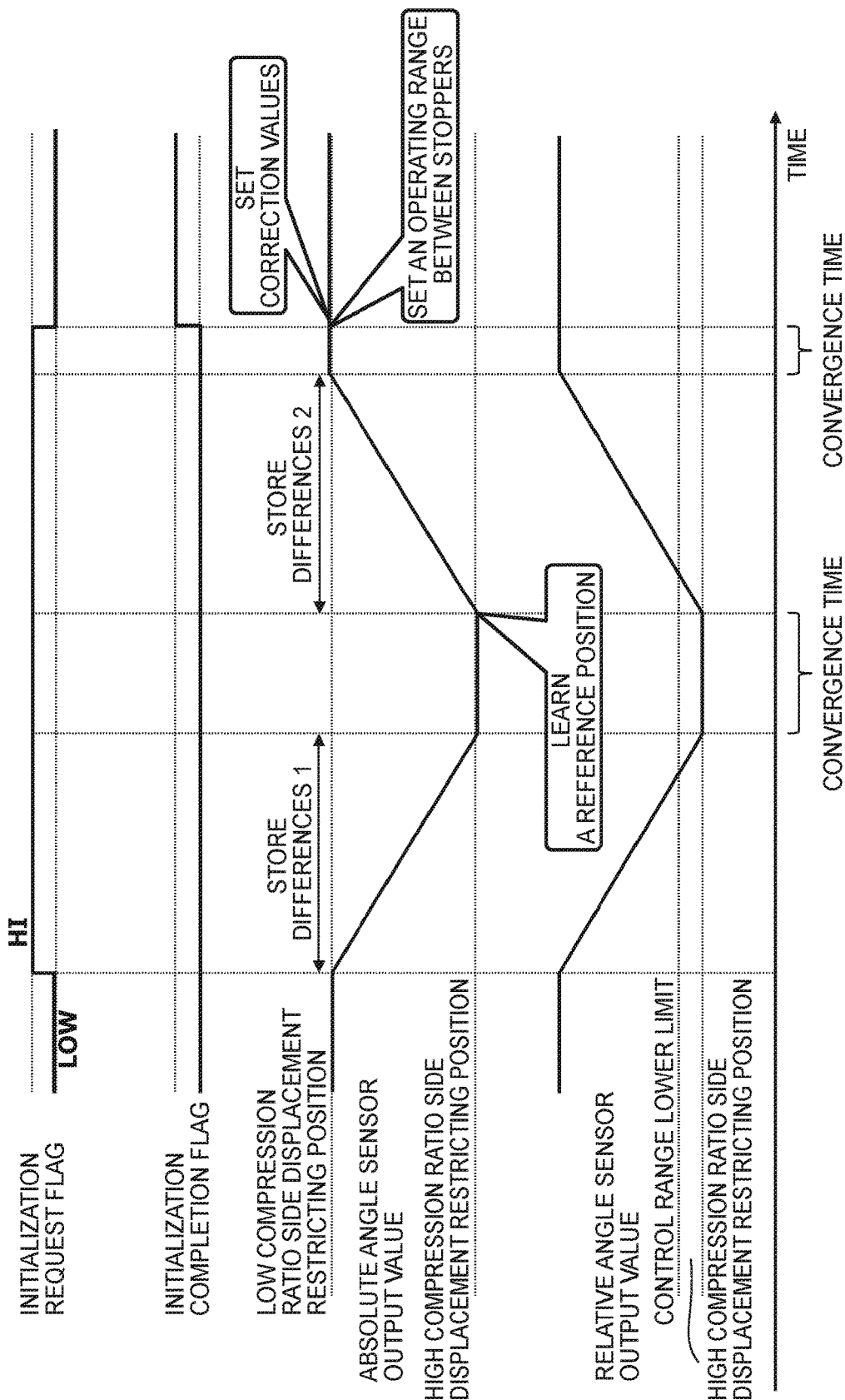
FIG. 5 is a time chart illustrating one example of the operation of the learning process.

According to the learning process described above, as illustrated in FIG. 5, when the initialization request flag that is output from the diagnostic tool is turned from LOW to HI, control shaft 196 of VCR mechanism 190 is rotated to the high compression ratio side, so that output values of relative angle sensor 280 and absolute angle sensor 290 start to gradually change toward the displacement restricting position on the high compression ratio side. In the course in which control shaft 196 changes toward the restricting position on the high compression ratio side, every time the absolute angle of control shaft 196 has reached the reference angle, a difference 1 obtained by subtracting an output value of absolute angle sensor 290 from an absolute angle obtained from an output value of relative angle sensor 280 in consideration of a reference point is stored. Then, when the first predetermined time has elapsed in the state where first member 210A of stopper mechanism 210 is in contact with second member 210B, i.e. in the state where the displacement to the high compression ratio side is restricted, an output value of absolute angle sensor 290 is learned (stored) as a reference position.

When the reference position learning has been completed, control shaft 196 of VCR mechanism 190 is rotated to the low compression ratio side, so that output values of relative angle sensor 280 and absolute angle sensor 290 start to gradually change toward the displacement restricting position on the low compression ratio side. In the course in which control shaft 196 changes toward the restricting position on the low compression ratio side, every time the absolute angle of control shaft 196 has reached the reference angle, a difference 2 obtained by subtracting an output value of absolute angle sensor 290 from an absolute angle obtained from an output value of relative angle sensor 280 in consideration of the reference point is stored. Then, when the second predetermined time has elapsed in the state where first member 210A of stopper mechanism 210 is in contact with second member 210B, i.e. in the state where the displacement to the low compression ratio side is restricted, an operating range of compression ratio control actuator 198 is set.

Figure 6:
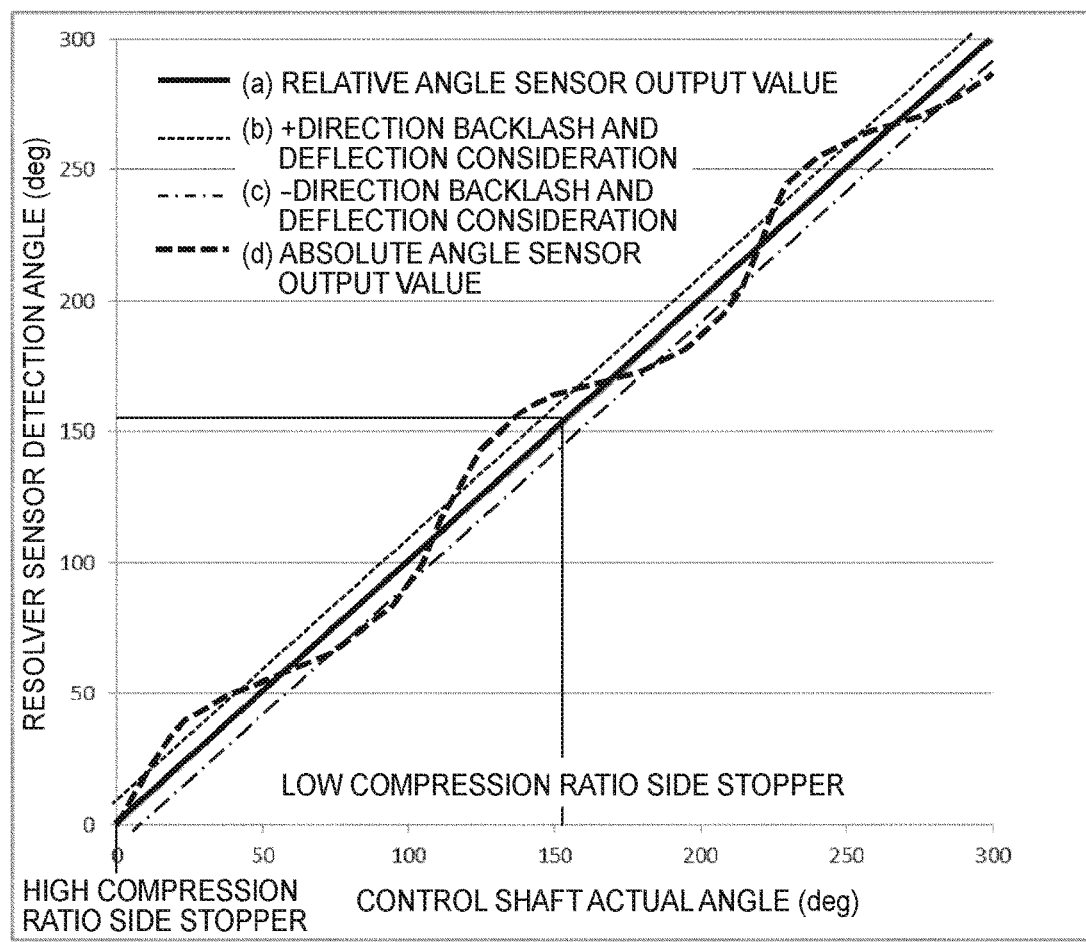
FIG. 6 is an explanatory diagram illustrating one example of a correction value for correcting an output value of an absolute angle sensor.

When the setting of the operating range of compression ratio control actuator 198 has been completed, a mean value of the difference 1 and the difference 2 is obtained per reference angle, and a correction value table having these mean values as correction values is set. Therefore, in the correction value table, as illustrated in FIG. 6, the correction values each obtained by subtracting an output value of absolute angle sensor 290 from an absolute angle obtained from an output value of relative angle sensor 280 in consideration of the reference point are set. This correction value represents a deviation of an output value of absolute angle sensor 290 per reference angle, so that the absolute angle detection accuracy can be improved by correcting the output value of absolute angle sensor 290 by this correction value. Since the absolute angle detection accuracy is improved, it is possible to improve the control accuracy of the compression ratio of internal combustion engine 100.

Figure 7:
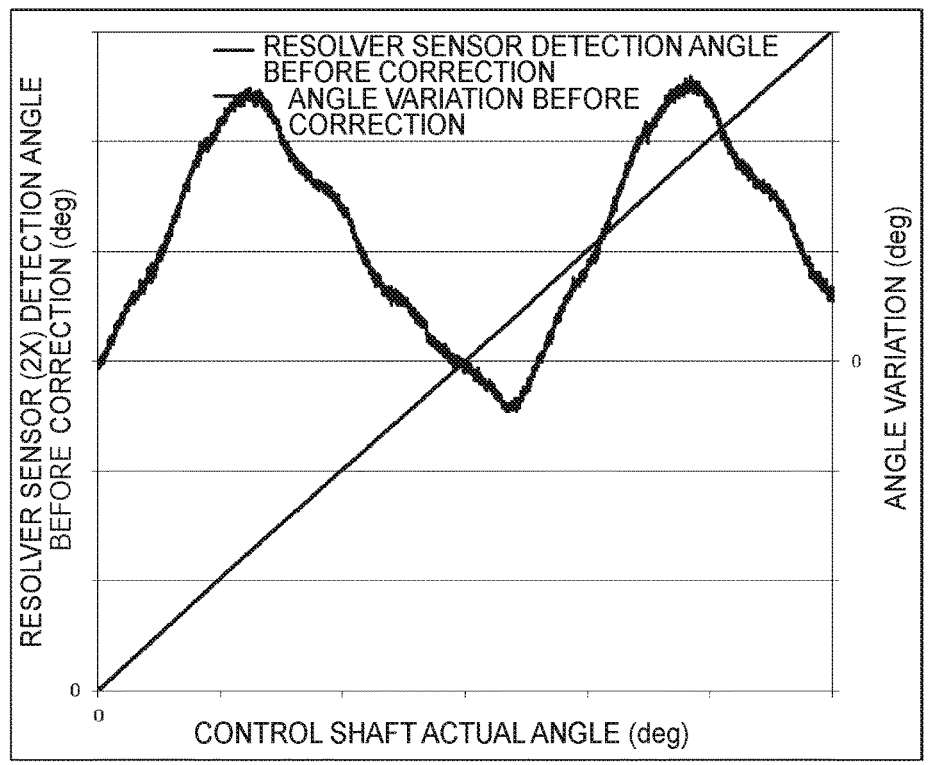
FIG. 7 is an explanatory diagram of angle variation when the output value of the absolute angle sensor is not corrected.
Figure 8:
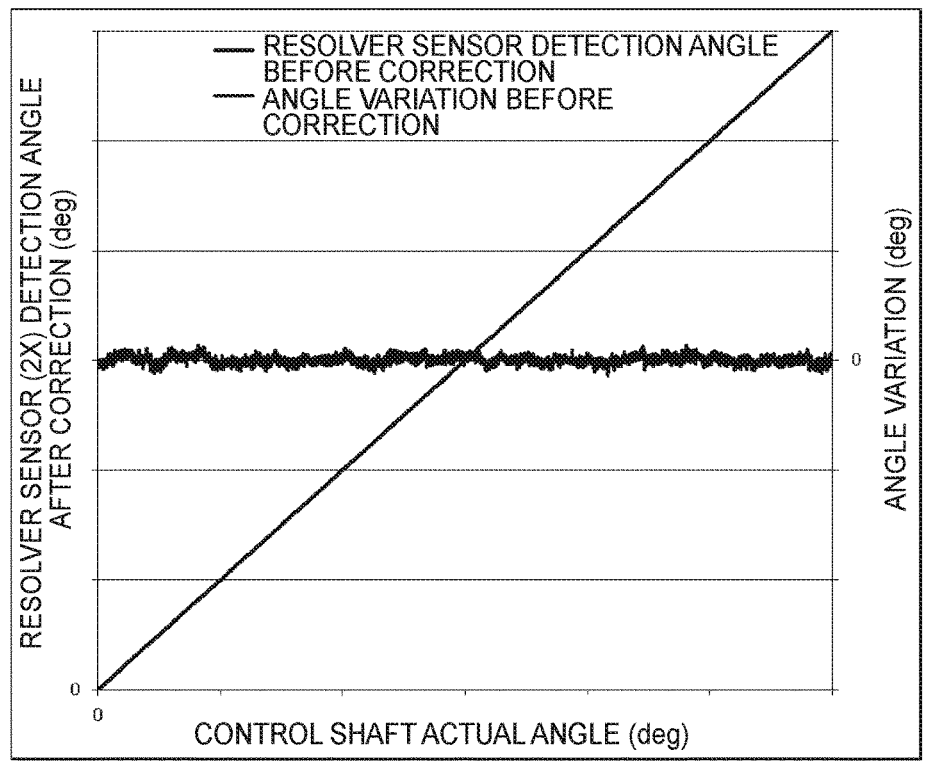
FIG. 8 is an explanatory diagram of angle dispersion when the output value of the absolute angle sensor is corrected.

As a result of verifying the absolute angle detection accuracy by execution, when a comparison was made between a case without correction illustrated in FIG. 7 and a case with correction illustrated in FIG. 8, detection angle dispersion in absolute angle was significantly decreased to about 1/10. This effect was obtained by setting the reference angle per 10°. By setting the reference angle more finely, it is possible to expect a further accuracy improvement. Further, this effect is one example obtained by execution and is not necessarily the same under various conditions.

Figure 9:
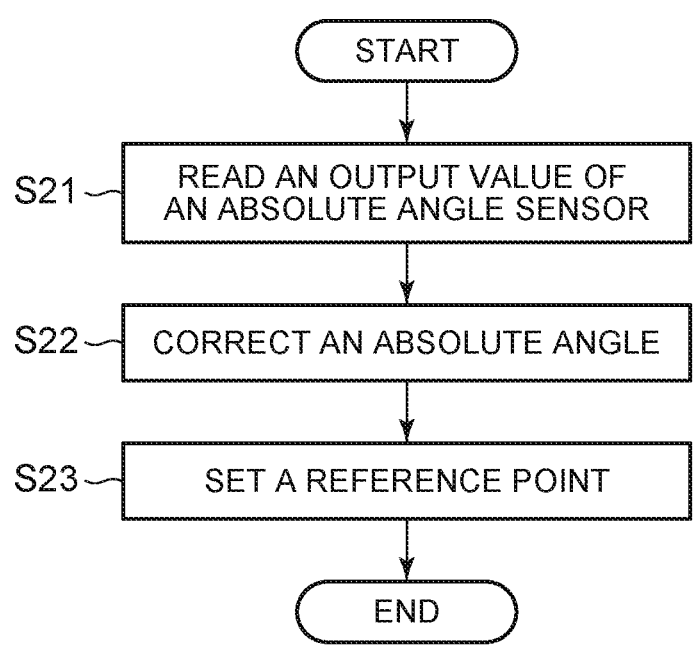
FIG. 9 is a flowchart illustrating one example of a reference point setting process.

FIG. 9 illustrates one example of a reference point setting process that is performed upon power-on by the processor of VCR controller 230 after the reference position and correction value learning process has finished.

At step 21, the processor of VCR controller 230 reads an output value of absolute angle sensor 290.

At step 22, the processor of VCR controller 230 refers to the correction value table stored in the non-volatile memory and corrects the output value of absolute angle sensor 290, i.e. an absolute angle of control shaft 196. Specifically, the processor of VCR controller 230 refers to the correction value table and obtains the correction value that corresponds to the absolute angle of control shaft 196. In this event, since the discrete correction values are set in the correction value table, it is possible to perform an interpolation process as needed. Then, the processor of VCR controller 230 corrects the absolute angle of control shaft 196, for example, by adding the correction value to the absolute angle of control shaft 196.

At step 23, the processor of VCR controller 230 writes the absolute angle of control shaft 196 corrected at step 22 into the non-volatile memory as a reference point.

According to the reference point setting process described above, for example, when VCR controller 230 is powered on by turning-on of an ignition switch, an absolute angle of control shaft 196 upon power-on is read from absolute angle sensor 290. Then, the absolute angle of control shaft 196 is corrected by the correction value corresponding to the absolute angle of control shaft 196, and this corrected absolute angle is set as a reference point. Therefore, in normal control thereafter, the compression ratio of internal combustion engine 100 is controlled based on an absolute angle of control shaft 196 that is obtained from an output value of relative angle sensor 280 having higher resolution than absolute angle sensor 290 in consideration of the reference point improved in accuracy. Therefore, the control accuracy of VCR mechanism 190 is improved, so that, for example, it is possible to improve the fuel consumption, the output power, and so on. Further, since the control accuracy of VCR mechanism 190 is improved, it is also possible to suppress interference between the valves and the piston, interference between control shaft 196 and stopper mechanism 210, a reduction in drivability, and so on.

Herein, one example of normal control will be described.

Figure 10:
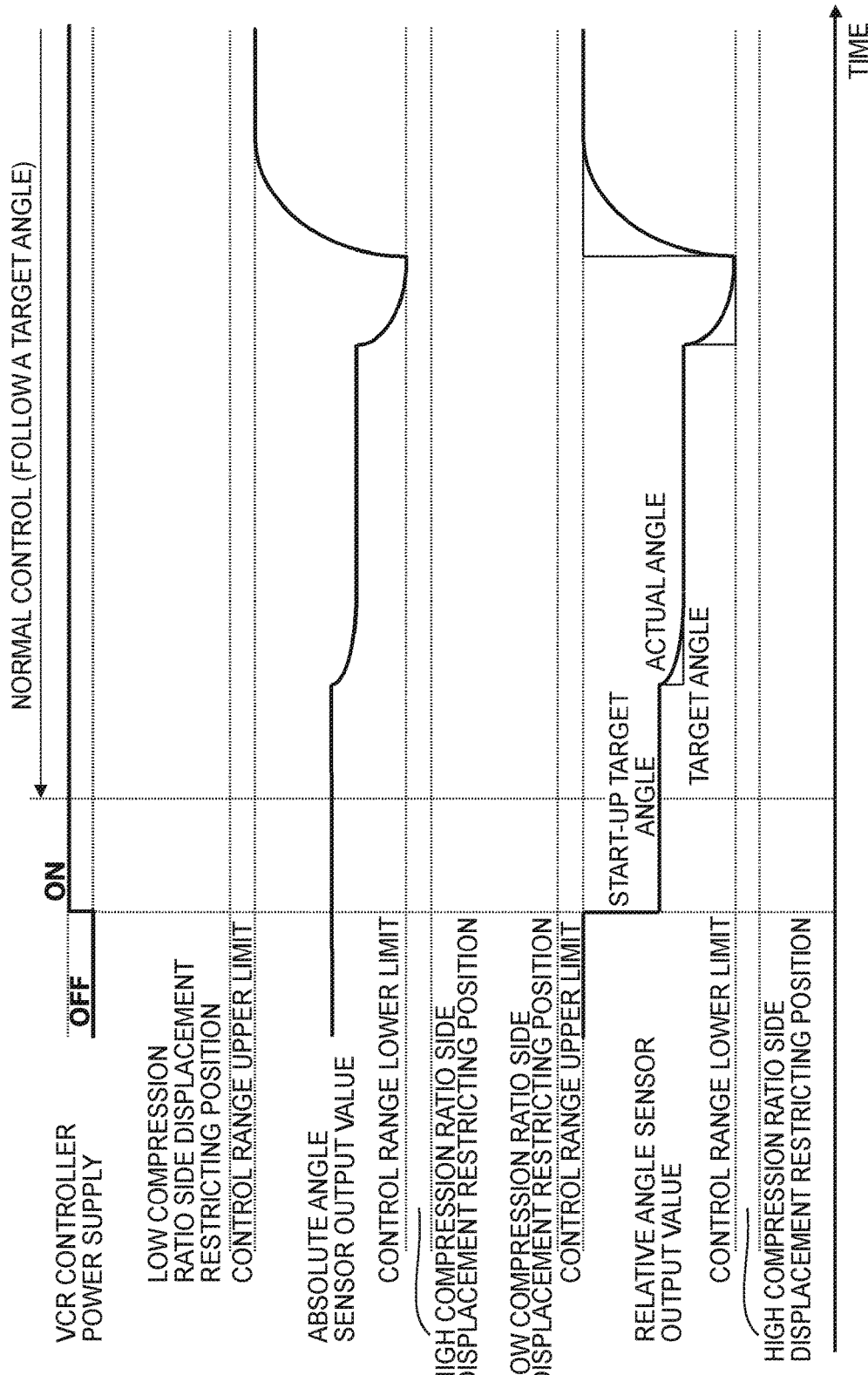
FIG. 10 is a time chart illustrating one example of normal control.

As illustrated in FIG. 10, when VCR controller 230 is powered on by turning-on of the ignition switch, after cranking by a starter, the control shifts to normal control that changes the compression ratio according to the operating state of internal combustion engine 100. In the normal control, VCR controller 230 controls a drive signal for compression ratio control actuator 198 of VCR mechanism 190 according to a target compression ratio (target angle) sent from engine controller 250. In this event, VCR controller 230 controls the compression ratio of internal combustion engine 100 within the control range that is defined by the maximum compression ratio and the minimum compression ratio, thereby, for example, suppressing the occurrence of abnormal noise or the like due to the operation of stopper mechanism 210. Since the actual compression ratio that is controlled by VCR mechanism 190 changes to the target compression ratio with a delay, the output value of absolute angle sensor 290 changes with a predetermined control delay as illustrated in the figure.

REFERENCE SYMBOL LIST

190 VCR Mechanism (Control Object Device)
196 Control Shaft (Drive Shaft)
198 Compression Ratio Control Actuator (Actuator)
198A Speed Reducer
210 Stopper Mechanism 230 VCR Controller (Control Device)
280 Relative Angle Sensor
290 Absolute Angle Sensor

The invention claimed is:

1. A control device for an internal combustion engine, comprising:
   a controller that controls a control object device based on an output value of a relative angle sensor configured to detect a relative angle of an output shaft of an actuator, and an output value of an absolute angle sensor configured to detect an absolute angle of a drive shaft coupled to the output shaft of the actuator via a speed reducer, wherein
      the control device corrects an output value of the absolute angle sensor based on an absolute angle of the drive shaft that is obtained from an output value of the relative angle sensor using, as a reference point, an output value of the absolute angle sensor at start-up of the internal combustion engine, and an output value of the absolute angle sensor.

2. The control device for the internal combustion engine according to claim 1, wherein
   the control device corrects the output value of the absolute angle sensor based on a deviation between the absolute angle of the drive shaft that is obtained from the output value of the relative angle sensor using, as the reference point, the output value of the absolute angle sensor at the start-up of the internal combustion engine, and the output value of the absolute angle sensor.

3. The control device for the internal combustion engine according to claim 2, wherein
   the deviation is obtained within a control range of the control object device.

4. The control device for the internal combustion engine according to claim 2, wherein
   the deviation is obtained based on a first value that is obtained when the control object device is displaced from one to the other of the control range, and a second value that is obtained when the control object device is displaced from the other to the one of the control range.

5. The control device for the internal combustion engine according to claim 4, wherein
   the deviation is obtained by averaging the first value and the second value.

6. The control device for the internal combustion engine according to claim 2, wherein
   the deviation is obtained per reference angle of the drive shaft.

7. The control device for the internal combustion engine according to claim 2, wherein
   when the deviation is beyond a predetermined range, the actuator is diagnosed to be abnormal.

8. The control device for the internal combustion engine according to claim 1, wherein
   the control object device is a variable compression ratio mechanism that changes a volume of a combustion chamber of the internal combustion engine, thereby making a compression ratio variable.

9. The control device for the internal combustion engine according to claim 1, further comprising a stopper mechanism that restricts rotation of the drive shaft at at least one of an upper limit and a lower limit of the control range of the control object device,
   wherein the reference point is corrected based on an absolute angle detected by the absolute angle sensor in a state where the rotation of the drive shaft is restricted by the stopper mechanism.

10. A control method for an internal combustion engine, comprising:
    controlling the internal combustion engine using a control device that controls a control object device based on an output value of a relative angle sensor configured to detect a relative angle of an output shaft of an actuator, and an output value of an absolute angle sensor configured to detect an absolute angle of a drive shaft coupled to the output shaft of the actuator via a speed reducer, wherein
    the control device corrects an output value of the absolute angle sensor based on an absolute angle of the drive shaft that is obtained from an output value of the relative angle sensor using, as a reference point, an output value of the absolute angle sensor at start-up of the internal combustion engine, and an output value of the absolute angle sensor.

* * * * *